(12) United States Patent
McClure (10) Patent No.: US 8,628,102 B2
(45) Date of Patent: Jan. 14, 2014

(54) EXTENDED CRANK SYSTEM

(76) Inventor: Brian Scott McClure, Dongan-gu (KR)

( * ) Notice: Subject to any disclaimer, the term of this patent is extended or adjusted under 35 U.S.C. 154(b) by 501 days.

(21) Appl. No.: 12/900,977

(22) Filed: Oct. 8, 2010

(65) Prior Publication Data

US 2011/0084463 A1 Apr. 14, 2011

Related U.S. Application Data

(60) Provisional application No. 61/250,741, filed on Oct. 12, 2009.

(51) Int. Cl.
*B62M 1/02* (2006.01)
*F16H 21/14* (2006.01)

(52) U.S. Cl.
USPC .............................. 280/259; 280/252; 74/63

(58) Field of Classification Search
USPC ................. 280/252, 256, 257, 259, 260, 261; 74/66, 67, 36, 594.3, 536, 143, 142
See application file for complete search history.

(56) References Cited

U.S. PATENT DOCUMENTS

| 4,577,879 | A | * | 3/1986 | Vereyken | ...................... | 280/256 |
| 7,007,570 | B2 | | 3/2006 | Gayoh | | |
| 2004/0045401 | A1 | | 3/2004 | Carrasco | | |
| 2005/0253355 | A1 | * | 11/2005 | Nacer | .......................... | 280/252 |

FOREIGN PATENT DOCUMENTS

| CN | 1337910 | 2/2002 |
| CN | 101242878 | 8/2008 |
| JP | 11263275 | 9/1999 |

OTHER PUBLICATIONS

First Office Action dated Aug. 1, 2012, CN Application No. 201010506379.5, 5 pages.

* cited by examiner

*Primary Examiner* — Tony Winner
*Assistant Examiner* — Jacob Knutson
(74) *Attorney, Agent, or Firm* — Dorsey & Whitney LLP (57) ABSTRACT

An extended crank system for a bicycle or similar crank driven system has frame with a bottom bracket and a pair of cranks operatively connected to opposite ends of the bottom bracket. A chain ring is operatively connected to one of the cranks. A crank hub is rotatably connected to each of the cranks and extends away from and is substantially parallel to the bottom bracket. A pair of crank extensions is connected to the crank hub, and a pair of crank extension hubs is connected to the pair of crank extensions. Additionally, a pair of crank followers is pivotably connected to opposite ends of the crank extension hubs at respective first ends of the crank followers, as well as pivotably connected to opposite ends of a top bracket mounted to the frame above the chain ring and behind the seat post, at respective second ends of the crank followers.

19 Claims, 6 Drawing Sheets

EXTENDED CRANK SYSTEM

CROSS REFERENCE TO RELATED APPLICATIONS

This application claims the benefit of priority pursuant to 35 U.S.C. §119(e) of U.S. provisional application No. 61/250,741 filed 12 Oct. 2009 entitled "Extended crank system," which is hereby incorporated herein by reference in its entirety.

BACKGROUND

Levers, such as bicycle cranks or wrenches, use torque to move objects and generally do not create much friction. Increasing the length of a lever usually increases the amount of torque provided when force is applied to the lever. A wrench with a built in ratcheting mechanism is one specific type of lever that allows a person to use a limited range of motion rather than a full rotation needed when using typical wrenches. Because of the limited range of motion needed by ratcheting wrenches, the lever arms can be quite long and therefore provide increased torque. Ratcheting wrenches can also be easier to use because they allow a person to exert a downward force at an efficient angle on the wrench.

Many bicycle cranks are typical levers. Typical bicycle cranks have a moment at 90 degrees (when the crank is up and perpendicular to the ground) where the crank is inefficient at moving the rear wheel because the torque created by the rider's foot is not as great as at other points in the pedaling rotation due to the angle at which the force is applied. Some bicycle cranks, such as rotor cranks, overcome this inefficiency by altering the pedaling motion so that as one crank finishes its downward turn, the other crank has already passed the point perpendicular to the ground, thus providing constant power to turn the rear wheel. Other bicycle cranks, such as the cranks described in U.S. Pat. No. 6,830,259 to Jakovljevic, have a secondary planetary sprocket which extends the effective length of the crank in order to provide more torque.

The information included in this Background section of the specification, including any references cited herein and any description or discussion thereof, is included for technical reference purposes only and is not to be regarded subject matter by which the scope of the invention is to be bound.

SUMMARY

An extended crank system is disclosed herein. The extended crank system includes a pair of four bar linkage systems which share a common bicycle or tricycle frame. The four bar linkage systems are designed to allow an elliptical pedaling motion that is located in front of the bottom bracket of a bicycle. This forward location in large part overcomes the moment encountered with conventional cranks where the rear wheel is inefficiently powered. The forward location also allows the effective length of the cranks to be increased, which increases the torque when a force is applied to the pedals. The angle at which the force is applied to the cranks during the elliptical pedaling motion may also create more torque because more of the descending portion of the elliptical pedaling motion is in the direction of the ground, rather than parallel to the ground.

In one implementation, the extended crank system suitable for powering a crank-driven transportation machine has a pair of cranks operatively connected to and extending from opposite ends of a bottom bracket mounted to a frame. A chain ring is operatively connected to one of the cranks. A pair of crank hubs is rotatably connected to each of the cranks and extends away from and parallel to and axis of the bottom bracket. A pair of crank extensions is connected to the pair of crank hubs, respectively. A pair of crank extension hubs is connected to the pair of crank extensions, respectively. A pair of crank followers is pivotably connected to opposite ends of the crank extension hub at respective first ends of the crank followers and pivotably connected to opposite ends of a top bracket mounted on the frame at respective second ends of the crank followers.

In another implementation, a bicycle has an extended crank system built about a frame. A bottom bracket is operatively connected to a bottom portion of the frame. A drive system has a first crank operatively connected to a first side of the bottom bracket; a chain ring operatively connected to the first crank and the bottom bracket; a first crank hub rotatably connected to the first crank; and a first crank extension operatively connected to the first crank hub, wherein when the first crank extension rotates, the first crank rotates. The drive system similarly has a second crank operatively connected to a second side of the bottom bracket; a second crank hub rotatably connected to the second crank; and a second crank extension operatively connected to the second crank hub, wherein when the second crank extension rotates the second crank rotates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

DETAILED DESCRIPTION

Figure 1A:
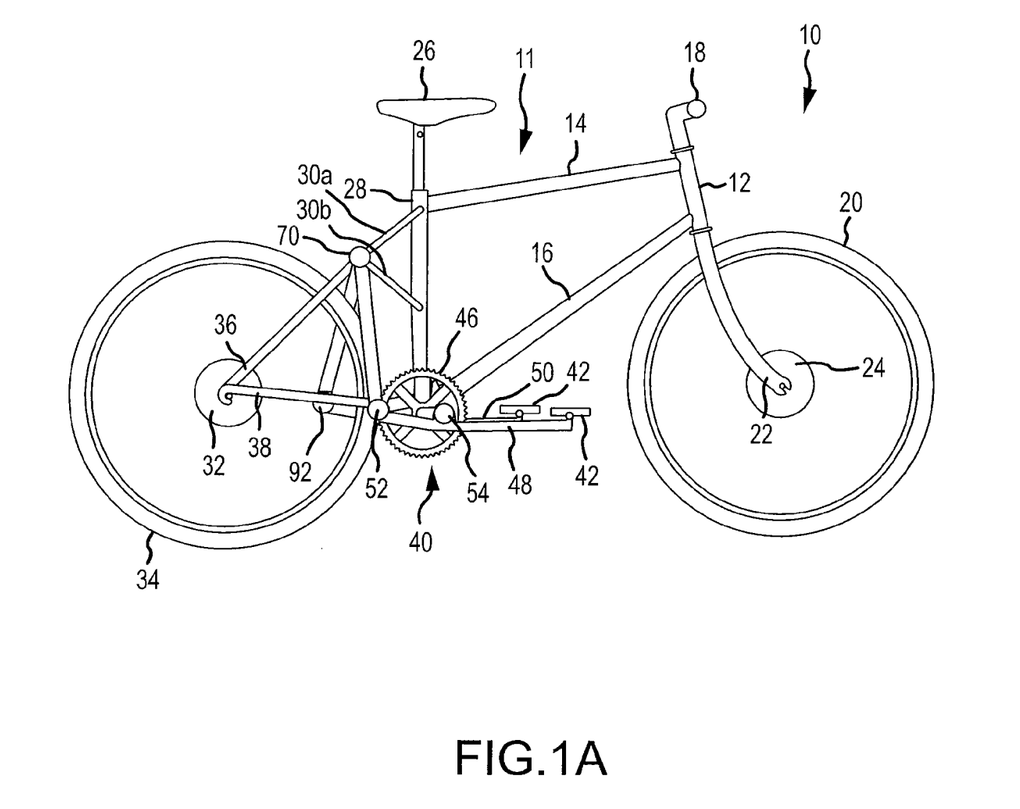
FIG. 1A is a side elevation view of a bicycle with an extended crank system.

FIG. 1A depicts one embodiment of the extended crank system 40 installed on a bicycle 10. The extended crank system 40 is shown on a bicycle 10, but other embodiments of the extended crank system 40 may be installed on a leaning tricycle or any other crank-driven transportation machine. The bicycle 10 includes a frame 11, a seat 26, wheels 20, 34, handle bars 18, and the extended crank system 40. The frame 11 in FIG. 1A includes at least a seat tube 28, a top tube 14, a down tube 16, a head tube 12, and a bottom bracket 74 (see FIG. 4). The front wheel 20 is attached to front forks 22 via a hub and axle 24. A top bracket 70 may be attached to the seat tube 28 by four top bracket support members 30a-30b as shown in FIG. 1A. A pair of seat stays 36 connect a hub and axle 32 the rear wheel 34 to the bicycle frame 11, and may either connect directly with the seat tube 28, or may bisect the top bracket 70 before reaching the seat tube 28. A pair of chain stays 38 attached to the bottom bracket and connecting with the lower ends of the seat stay 36 may also help support the rear wheel 34.

Figure 1B:
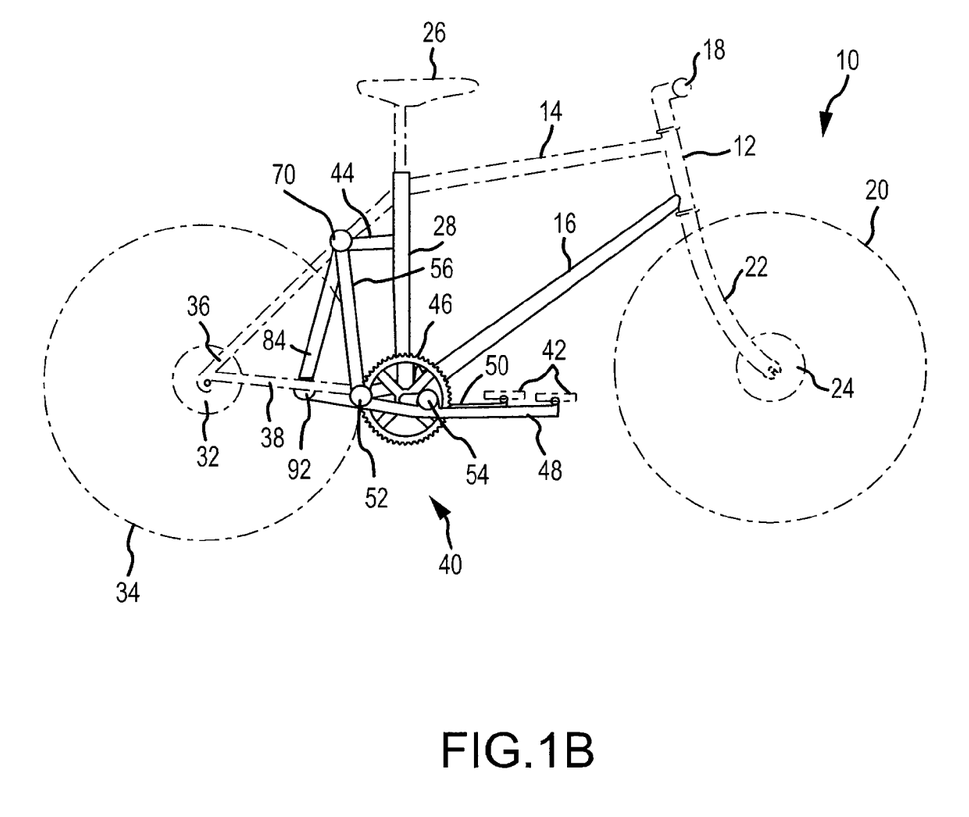
FIG. 1B is a side elevation view of a bicycle with an extended crank system having an alternate top bracket attachment.

As shown in FIG. 1A, the top bracket support members 30a-30b may bisect and extend beyond the top bracket 70 to form standard seat stays 36 that intersect with the chain stays 38. Alternatively, the seat stays 36 may be separate members either attached to the top bracket 70 or attached directly to the seat tube 28 in a different location than the top bracket 70. FIG. 1B shows an alternative attachment configuration for the top bracket 70 on the bicycle 10. The top bracket 70 is attached generally perpendicularly to the seat tube 28 with one support member 44 (not including the seat stays 36 if they bisect the top bracket 70). Either configuration of support structure for the top bracket 70 may be implemented with the extended crank system 40.

Figure 2:
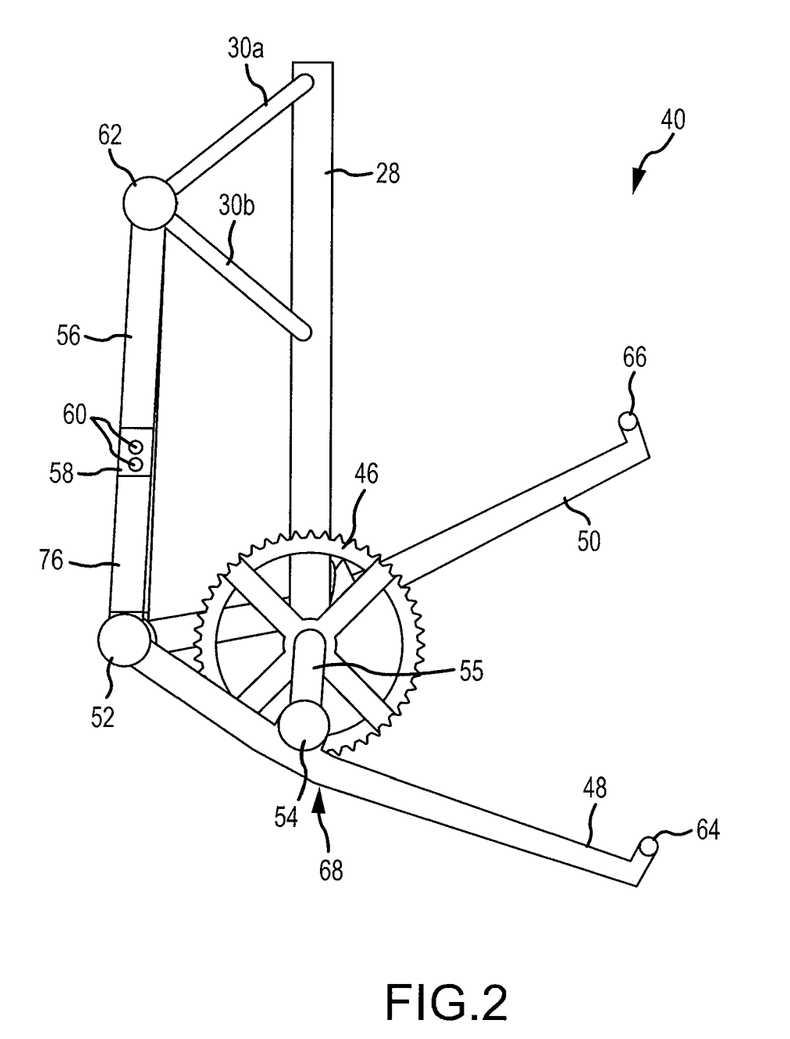
FIG. 2 is an enlarged view of the extended crank system of FIG. 1.

In one embodiment of the extended crank system 40, as best seen in FIG. 2, a right crank 55 is connected to and extends radially away from the bottom bracket 74. A right crank extension 48 is connected to the right crank 55 by a right crank hub 54 and extends forward, supporting a right pedal 42 on a right pedal support 64. The distance from the pedal 42 to the bottom bracket 74 may be more than the same distance on a conventional bicycle crank, and may therefore supply more torque when a force is applied. The right crank extension 48 also extends rearward and connects to a right crank follower 56 through a right crank extension hub 52. The right crank follower 56 is connected to the top bracket 70 at a pivot joint 62. In addition, the right crank 55 has a chain ring 46 attached to turn a chain (not shown) and power the rear wheel 34.

Figure 4:
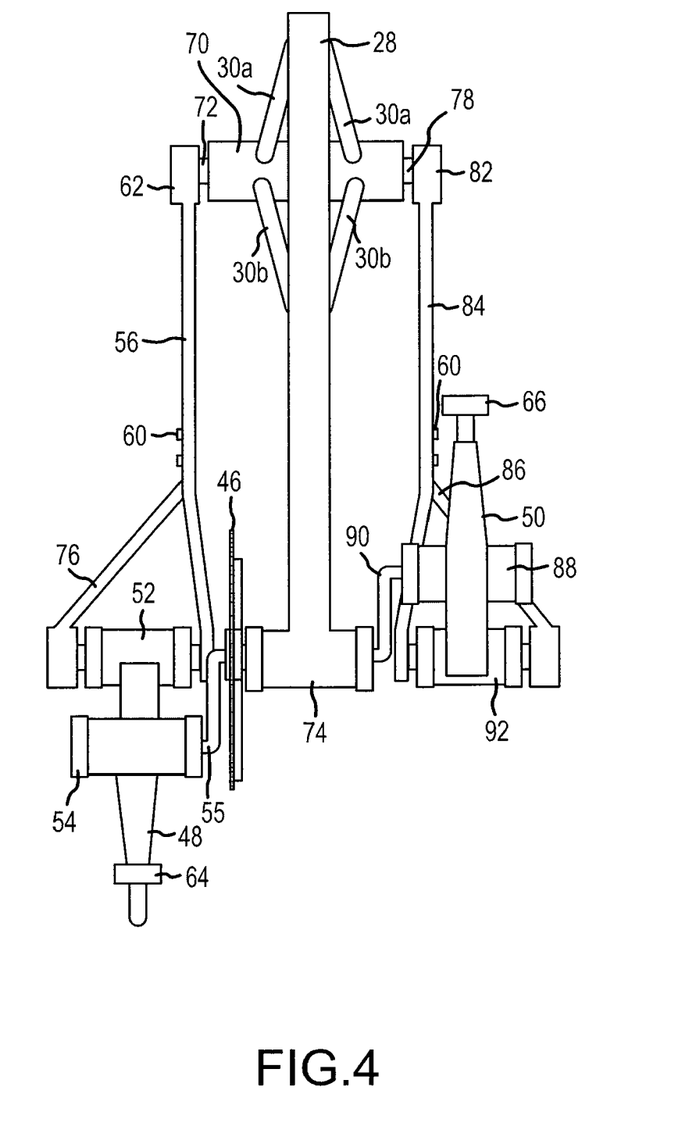
FIG. 4 is a front elevation view of the extended crank system of FIG. 1.

As shown in FIG. 4, the crank system 40 on the left side of the bicycle 10 mirrors the system on the right. Specifically, a left crank 90 is connected to and extends radially away from the bottom bracket 74. A left crank extension 50 is connected to the left crank 90 by a left crank hub 88 and extends forward, supporting a left pedal 42 at the left pedal support 66. The left crank extension 50 also extends rearward and connects to a left crank follower 84 through a left crank extension hub 92. The left crank follower 84 is pivotally connected to the top bracket 70 at a pivot joint 82. Each crank 55, 90, crank extension 48, 50, crank follower 56, 84, in combination with the top bracket 70, as attached to the bicycle frame 11, forms a system similar to a four bar linkage.

FIG. 4 shows a front view of the extended crank system 40. In the embodiment shown in FIG. 4, the portion of the bicycle frame 11 that includes the bottom bracket 74 (which may or may not be attached by lugs, depending on the type of frame), the top bracket 70 (which may or may not be attached by lugs as well), the seat tube 28, and the top bracket support(s) (e.g. 30a-30b, 44) may be constructed first in order to properly align the moving parts of the extended crank system 40. First the bottom bracket 74 (and attached lugs, if applicable) may be machined to form one piece, and the top bracket 70 (and attached lugs, if applicable) may be machined to form one piece. Next, the top bracket 70, the top bracket supports 30a-30b, 44, the seat tube 28 and the bottom bracket 74 may be aligned and connected.

Following construction of this portion of the bicycle frame 11, the remaining portions of the bicycle frame 11 may be added (including the chain stays 38, seat stays 36, down tube 16, and top tube 14). The right and left crank hubs 54, 88 and right and left crank extensions 48, 50 may then be added and aligned so that the segment of the crank extensions 48, 50 between the hubs 54, 88 is a straight line. For example, as shown in FIG. 2, the right crank extension 48 before the bend point 68 is straight and then at the bend point 68 bends slightly upward when past the right crank hub 54. In some embodiments, the right crank follower 56 may be slightly bent to accommodate the positioning of the right crank extension 48.

The crank hubs 54, 88 and extension hubs 52, 92 can be constructed in many different ways. In one embodiment, shown in FIG. 4, the hubs 52, 54, 88, 92 may be similar to bottom bracket 74 cartridge bearing assemblies. For example, the hubs 52, 54, 88, 92 may include sealed adapter units screwed into both sides of a bottom bracket 74 cartridge.

The top bracket 70 can also be constructed in several different ways. In the embodiment shown in FIG. 4, the top bracket 70 has two separate bearing elements inside the top bracket 70 shell, one corresponding to each crank follower 56, 84. The bearing elements may be similar to some bottom bracket 74 cartridges that allow adapters to fit inside the top bracket 70 shell. For example, spindle 72 of the right crank follower 56 may be connected to the right bearing element through an adapter with a locknut to hold the assembly in place. Similarly, a spindle 78 of the left crank follower 84 may be connected to the left bearing element through an adapter with a locknut to hold the assembly in place. Further, an inner cover, inside the top bracket 70 may connect between the bearing elements to provide resistance against the locknuts and to prevent dirt from entering the assembly.

In the embodiment shown in FIG. 4, the crank followers 56, 84 may each additionally have a short brace 76, 86 that connects to an outer side of the respective crank extension hubs 52, 92 and is fixed at a small plate area 58 along the crank followers 56, 84. The braces 76, 86 may be attached to the crank followers 56, 84 via bolts or rivets 60. In other embodiments, the braces 76, 86 may be welded to the crank followers 56, 84. In this embodiment, the crank followers 54, 84 may allow for a narrower connection to the crank extension hubs 52, 92 and consequently provide more room between the crank followers 56, 84 for the chain stays 38. In another embodiment, the short braces 76, 86 may be integrally formed with the crank followers 56, 84.

Figure 5:
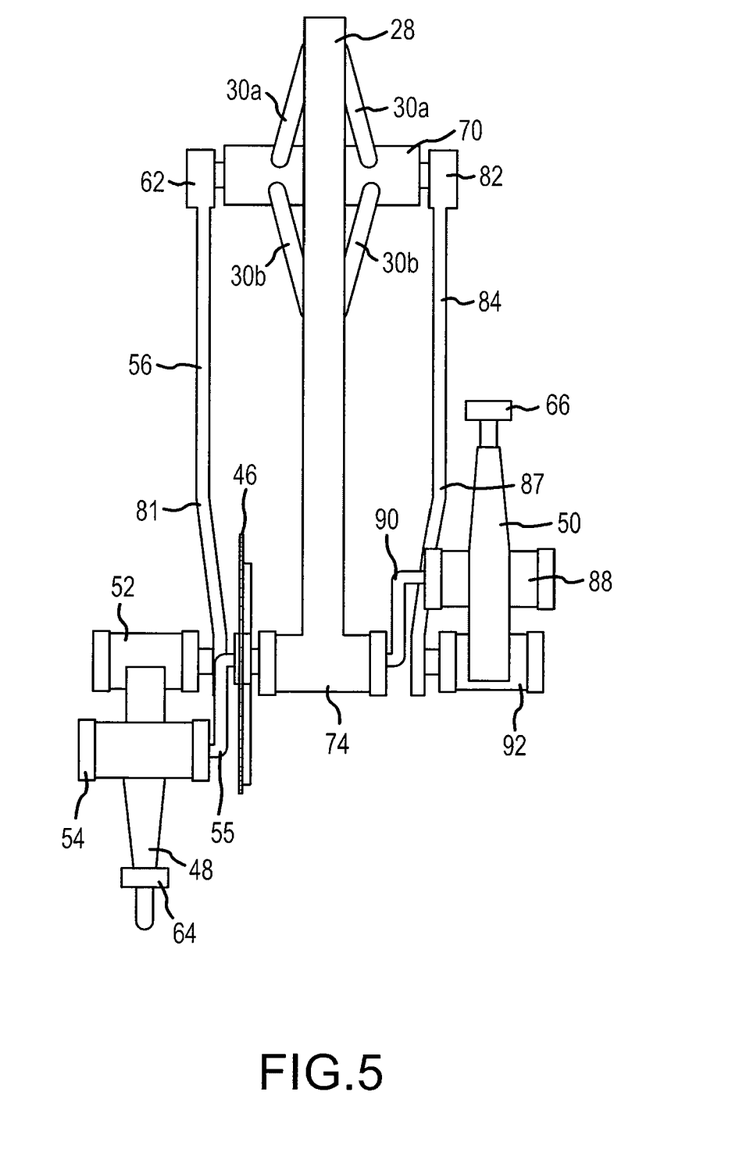
FIG. 5 is an alternative crank follower design for an extended crank system for a cycle.

In another embodiment shown in FIG. 5, the crank followers 56, 84 are attached to only one side of the crank extension hubs 52, 92. In this embodiment, the crank followers 56, 84 may be attached to the inner sides (facing the frame 11) of the extension hubs 52, 92 of the bicycle 10.

In some embodiments, the bicycle frame 11 may be altered to allow the crank extensions 48, 50 to fit between the two wheels 20, 34. The top tube 14, for example, may be lengthened and the head tube 12 moved forwards. The seat tube 28 may be positioned straight up and down. The seat stays 36 may be lengthened to cover the distance between the rear wheel 34 hub 32 and the seat tube 28. In some embodiments, the alterations to the bicycle frame 11 may allow the rider's weight to be evenly distributed between the two wheels 20, 34 of the bicycle 10.

In another embodiment, the bicycle frame 11 may be altered by extending the down tube 16 past the seat tube 28 to support the bottom bracket 74 behind the seat tube 28. In this embodiment, the seat tube 28 may be affixed to the down tube 16 at an intermediate location along the length of the down tube 16. The bottom bracket 74 and chain ring 46 are thus positioned behind the seat tube 28 to thereby position the crank extensions 48, 50 in front of the seat tube 28. In this way, the distance between the seat 26 and the handlebars 18 need not be increased, and still provide an appropriate distance for the cranks 55, 90 to fit between the wheels 20, 34.

FIG. 2 shows an enlarged view of the extended crank system 40 of FIGS. 1A and 1B. As can be seen in FIG. 2, the right crank 55 rotates within and about the axis of the bottom bracket 74 and has a chain ring 46 attached. The distal end of the right crank 55 rotates inside the right crank hub 54, which may be located near and connected to an intermediate location of the right crank extension 48. On the forward end of the right crank extension 48, a pedal 42 is pivotably supported by the right pedal support 64. The right crank extension 48 may bend slightly at a position below or adjacent to the right crank hub 54 at a bend point 68 to form an obtuse angle. In this way the right crank extension 48 may be formed to avoid interfering with the rider's heel and disrupt the pedaling motion. The right crank extension 48 may support the right pedal 42 in the same manner as conventional bicycle cranks do (i.e., on the side of the pedal). Alternatively, the right crank extension 48 may support the right pedal as shown in FIG. 2, i.e., from below, near the center of the pedal 42 via the right pedal support 64. This configuration of pedal support may be used to accommodate riders with riding shoes having clips. This connection may additionally reduce the Q factor (i.e., the horizontal distance between each of the cranks) of a bicycle implemented with the extended crank system 40. The rearward end of the right crank extension 48 supports a right crank extension hub 52. The bottom end of the right crank follower 56 pivots inside the right crank extension hub 52, and the top end of the right crank follower 56 pivots inside the top bracket 70, which is attached to the seat tube 28.

The left side of the extended crank system 40 shown in FIG. 2 is similar to the right side of the extended crank system 40. In particular, the left crank 90 rotates within and about the axis of the bottom bracket 74 and the distal end of the left crank 90 rotates inside the left crank hub 88. The left crank hub 88 may be located near and connected to an intermediate location of the left crank extension 50. On the forward end of the left crank extension 50, a pedal 42 is supported by the left pedal support 66. The left crank extension 50 may bend slightly at a position below the left crank hub 88 to form an obtuse angle. In this way the left crank extension 50 does not interfere with the rider's heel and disrupt the pedaling motion. (This is shown with respect to the right crank extension 48 at the bend point 68.) The left crank extension 50 may support the left pedal 42 with a left pedal support 66 in the same manner as a conventional bicycle crank or, alternatively, it may support the pedal 42 or cyclists shoe from below as shown in FIG. 2. The rearward end of the left crank extension 50 supports a left crank extension hub 92. The bottom end of the left crank follower 84 pivots inside the left crank extension hub 92, and the top end of the left crank follower 84 pivots inside the top bracket 70, which is attached to the seat tube 28.

The length of the crank followers 56, 84 determines the arc through which the crank extension hubs 54, 88 swing. For example, a longer right crank follower 56 may result in a relatively flat arc, which may lead to a more uniform pedaling motion. A shorter right crank follower 56 may result in a more curved arc, which may lead to uneven pedaling motions.

As described above with respect to FIGS. 1A and 1B, the top bracket 70 may be attached to the bicycle frame 11 in several different ways. In one embodiment, the top bracket 70 is supported by four support members 30a-30b extending from the seat tube 28 as shown in FIGS. 1A and 2. In another embodiment, the top bracket 70 is supported in the middle by a top bracket 40 support extending perpendicularly from the seat tube 28 as shown in FIG. 1B. In any embodiment, the top bracket 70 will experience up and down forces as the left and right crank followers 56, 84 are pushed up against the top bracket 70. These forces may be able to be reduced if the seat stays 36 are attached to support the top bracket 70.

Figure 3:
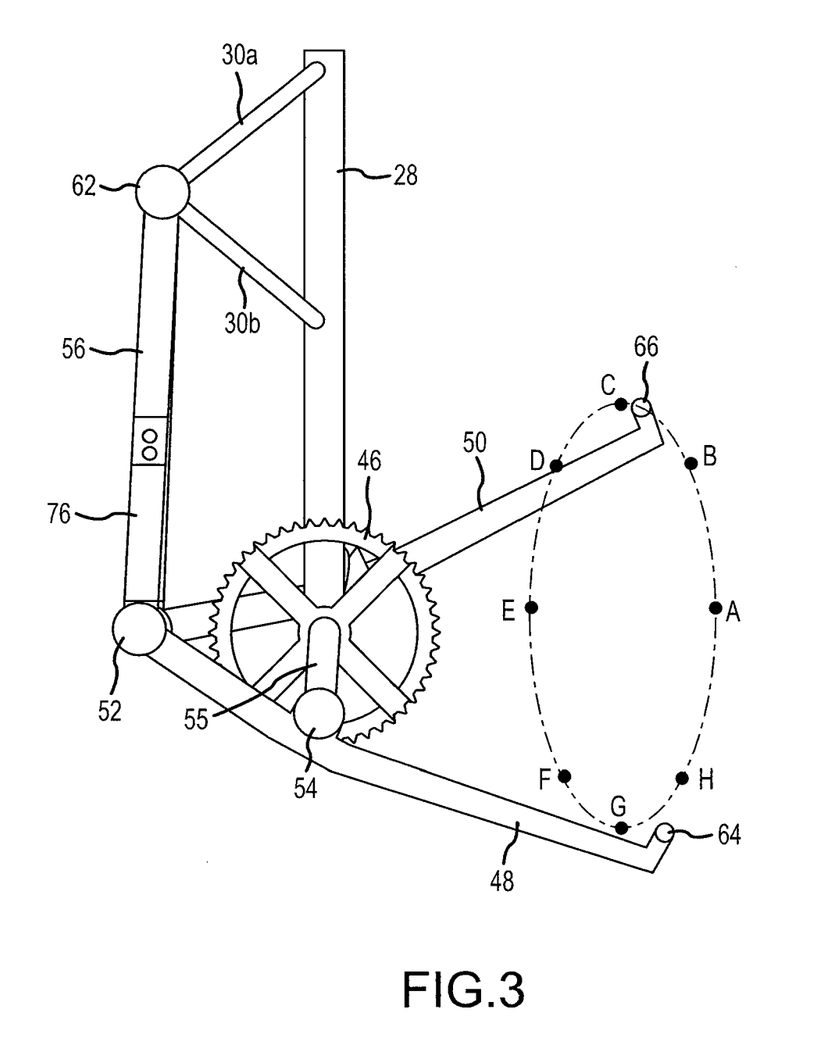
FIG. 3 schematically depicts the pedaling motion of the extended crank system of FIG. 3.

The pedaling motion of the extended crank system 40 is shown in FIG. 3. A dashed oval is drawn to depict the pedaling motion. The right pedal support 64 is at point G on the oval and the left pedal support 66 is at point C. As the cranks 55, 90 rotate clockwise, for example, as a user pedals, the right pedal support 64 will move to point F and the left pedal support 66 will move to point B. In one embodiment, the pedaling motion may be slower between points D and B, and between points H and F. The pedaling motion may be quicker on the other segments, between points B and H and between points F and D. As can been seen from the shape of the dashed oval, the shape of the pedaling motion is substantially elliptical. The elliptical shape produces more torque than other, more circular motions, because more of the descending portion of the elliptical pedaling motion is in the direction of the ground, rather than parallel to the ground. Additionally, Q rings, for example oval, shaped chain rings, may be used in some embodiments to alter the pedaling speed at various segments of the chain ring 46. In other embodiments, Q rings may not be needed.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An extended crank system suitable for powering a crank-driven transportation machine comprising
    a frame
    a bottom bracket mounted to the frame;
    a pair of cranks operatively connected to and extending from opposite ends of the bottom bracket;
    a chain ring operatively connected to one of the cranks;
    a top bracket mounted to the frame;
    a pair of crank hubs rotatably connected to each of the cranks and extending away from and parallel to an axis of the bottom bracket;
    a pair of crank extensions connected to the pair of crank hubs, respectively;

a pair of crank extension hubs connected to the pair of crank extensions, respectively; and a pair of crank followers each pivotably connected to a respective one of the crank extension hubs at respective first ends of the crank followers and pivotably connected to opposite ends of the top bracket at respective second ends of the crank followers.

2. The extended crank system of claim 1 further comprising a tube extending from the bottom bracket; and a top bracket support operatively connected to the tube and the top bracket, wherein the top bracket support securely attaches the tube to the top bracket.

3. The extended crank system of claim 2, wherein the top bracket support comprises two or more support bars, wherein each of the two or more support bars spans between the top bracket and the tube.

4. The extended crank system of claim 2, wherein the crank extensions are substantially straight between the crank hub and the crank extension hubs.

5. The extended crank system of claim 4, wherein the crank extensions each form an obtuse angle.

6. The extended crank system of claim 5, wherein a vertex of the obtuse angle is positioned forward of the crank extension hubs.

7. The extended crank system of claim 1, wherein a forward end portion of each of the crank extensions moves in a substantially elliptical motion.

8. A bicycle comprising
a frame;
a top bracket mounted to a top portion of the frame;
a bottom bracket operatively connected to a bottom portion of the frame; and
a drive system comprising
a first crank operatively connected to a first side of the bottom bracket;
a chain ring operatively connected to the first crank and the bottom bracket;
a first crank hub rotatably connected to the first crank;
a first crank extension operatively connected to the first crank hub, wherein when the first crank extension rotates, the first crank rotates;
a first crank extension hub operatively connected to the first crank extension;
a first crank follower pivotably connected to the first crank extension at a bottom end and pivotably connected to the to bracket at a to end;
a second crank operatively connected to a second side of the bottom bracket;
a second crank hub rotatably connected to the second crank; and
a second crank extension operatively connected to the second crank hub, wherein when the second crank extension rotates the second crank rotates;
a second crank extension hub operatively connected to the second crank extension; and
a second crank follower pivotably connected to the second crank extension at a bottom end and pivotably connected to the top bracket at a top end.

9. The bicycle of claim 8 wherein the frame further comprises
a seat tube;
a top bracket positioned behind the seat tube; and a top bracket support connecting the top bracket to the seat tube, wherein the top bracket support spans between the top bracket and the seat tube.

10. The bicycle of claim 9, wherein the top bracket support comprises four support bars.

11. The bicycle of claim 8, wherein the frame further comprises
a seat tube; wherein
the top bracket is operably connected to the seat tube.

12. The bicycle of claim 11, wherein
the first crank follower is pivotably connected to the first crank extension hub at two locations; and
the second crank follower is pivotably connected to the second crank extension hub at two locations.

13. The bicycle of claim 12, wherein the first crank follower comprises
a first main member; and
a first support member extending from an intermediate location along the first main member, wherein the first main member is connected to a first side of the first crank extension hub and the first support member is connected to a second side of the first crank extension hub; and
the second crank follower comprises
a second main member; and
a second support member extending from an intermediate location along the second main member, wherein the second main member is connected to a first side of the second crank extension hub and the second support member is connected to a second side of the second crank extension hub.

14. The bicycle of claim 8, wherein the frame further comprises
a head tube;
a seat tube;
a pair of forks rotatably connected to the head tube;
a down tube connected to the seat tube and the head tube; and
a top tube connected to the seat tube and the head tube.

15. The bicycle of claim 14 further comprising
a pair of seat stays connected at a first end to the top bracket; and
a pair of chain stays connected to the bottom bracket at a first end and connected to the pair of seat stays, respectively, at a second end.

16. The bicycle of claim 15 further comprising
a front wheel rotatably connected to the frame; and
a rear wheel rotatably connected to both the pair of chain stays and the pair of seat stays, and operably connected to and powered by the drive system.

17. The bicycle of claim 8, further comprising
a first pedal operatively attached to a forward end of the first crank extension; and
a second pedal operatively attached to a forward end of the second crank extension.

18. The bicycle of claim 17, wherein
a bottom surface of the first pedal attaches to the first crank extension; and
a bottom surface of the second pedal attaches to the second crank extension.

19. The bicycle of claim 17 wherein the first pedal and the second pedal move in a substantially elliptical motion.

* * * * *

UNITED STATES PATENT AND TRADEMARK OFFICE
CERTIFICATE OF CORRECTION

PATENT NO. : 8,628,102 B2
APPLICATION NO. : 12/900977
DATED : January 14, 2014
INVENTOR(S) : Brian Scott McClure It is certified that error appears in the above-identified patent and that said Letters Patent is hereby corrected as shown below:

In the Claims

In claim 8, in column 7, at line 46, delete the second and third instances of "to" in the line and replace each with "top"

Signed and Sealed this
Fifth Day of August, 2014

Michelle K. Lee
*Deputy Director of the United States Patent and Trademark Office*